United States Patent

Massey

[15] 3,654,482
[45] Apr. 4, 1972

[54] MIRRORLESS OPTICAL CAVITY

[72] Inventor: Gail A. Massey, San Mateo, Calif.

[73] Assignee: The United States of America as represented by the Secretary of the Navy

[22] Filed: Mar. 12, 1971

[21] Appl. No.: 123,514

[52] U.S. Cl. ............................ 307/88.3, 331/96, 331/107 R
[51] Int. Cl. .......................................................... H03f 7/04
[58] Field of Search ................. 307/88.3; 330/4, 5; 331/94.5, 331/96, 107

[56] References Cited

UNITED STATES PATENTS 3,577,093  5/1971  Simpson ............................. 331/94.5
3,602,724  8/1971  Smith ................................... 307/88.3

Primary Examiner—Roy Lake
Assistant Examiner—Darwin R. Hostetter
Attorney—R. S. Sciascia, Arthur L. Branning, Philip Schneider and M. L. Crane

[57] ABSTRACT

This disclosure is directed to an optical parametric oscillator operable in the visible and made of components which are not damaged by high power laser radiation or environmental effects.

5 Claims, 1 Drawing Figure

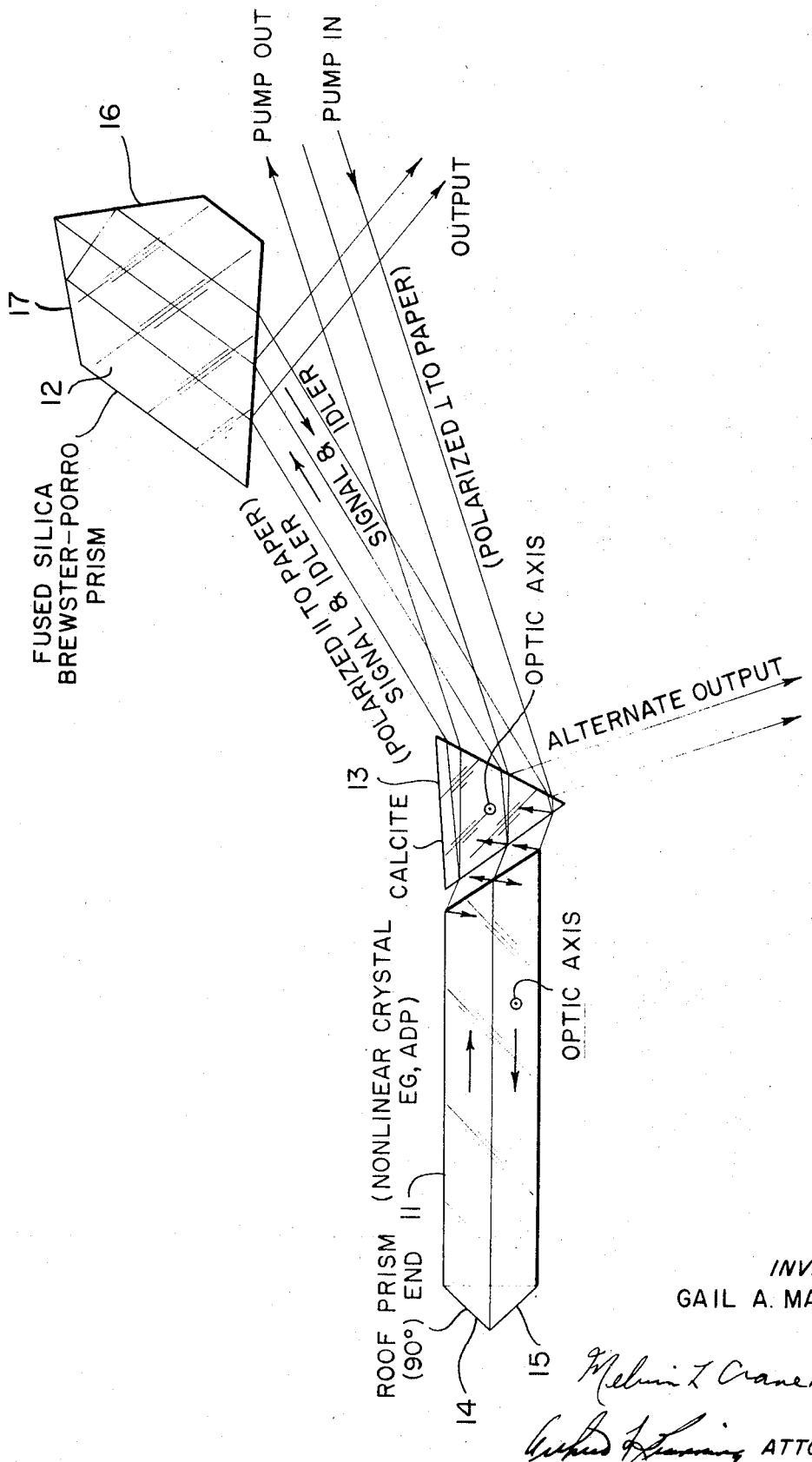

MIRRORLESS OPTICAL CAVITY

STATEMENT OF GOVERNMENT INTEREST

The invention described herein may be manufactured and used by or for the Government of the United States of America for governmental purposes without the payment of any royalties thereon or therefor.

This invention was developed under contract with the Office of Naval Research of the Navy Department.

BACKGROUND OF THE INVENTION

This invention is directed to a laser light system and more particularly to a parametric oscillator made of components which will withstand high power laser radiation.

Heretofore, resonant cavities have been made in which the surfaces have been optically coated for reflecting light. The coming of high power lasers has brought about failure and deterioration of coated reflective surfaces. Not only is there failure due to the coatings but the coatings must have the proper characteristics for the signal, idler, and pump, wavelengths. These problems have been overcome by substituting totally internally reflecting elements such as porro-prisms for the silver coated or multi-layer dielectric coated mirrors which are normally used and by using Brewster faces on all optics inside the cavity. Substitution of porro-prisms as reflecting surfaces creates a problem on how to provide an output. One way of providing an output is to make use of a beam splitter. The beam splitter diverts a portion of the light out of the resonant cavity as an output beam. With this system, a portion of the light is lost by diversion into an undesired light path in the opposite direction from the desired output. U.S. Pat. No. 3,464,026 has provided an additional porro prism for directing undesired reflected light beam back into the system such that the normally lost light beam is not lost.

SUMMARY OF THE INVENTION

This invention is directed to a laser cavity comprising two Brewster-porro prisms, one of which is a nonlinear crystal, separated by a birefringent minimum-deviation prism of calcite. Pump energy enters the cavity as an extraordinary wave in the calcite prism and leaves the cavity in the same way after two passes through the nonlinear crystal.

STATEMENT OF THE OBJECTS

It is therefore an object of the present invention to provide a parametric oscillator which is rugged and not subjected to damage due to incident light.

Another object is to provide an optical system which extracts light from an optical cavity with little wasted light.

Still another object is to provide an optical system free of optical coatings on the reflective surfaces.

Yet another object is to provide a system which avoids operational problems relative to the different wavelengths of the signal, idler, and pump radiation.

Other and more specific objects of this invention will become apparent upon a more careful consideration of the following detailed description when considered with the accompanying drawing.

The drawing illustrates a schematic of the elements of the system.

Now referring to the drawing there is shown by illustration an optical cavity including two Brewster-porro prisms 11 and 12 separated by a birefringent minimum-deviation prism 13 formed of calcite. The Brewster-porro prisms are such that they include a combination of Brewster-angle refractions and total internal reflections and the surfaces that receive light are coated with antireflection coatings to prevent reflection of light back along the path. Prism 11 is a nonlinear crystal such as an ammonium dihydrogen phosphate, ADP, in which the Z axis is perpendicular to the plane of the schematic diagram and the X and Y axis are 45° from the direction of propagation of the light. As shown, one end of the ADP nonlinear crystal is provided with 90° roof ends which reflects light from one roof end surface to the other such that light passing through the non-linear crystal is reflected back parallel with the light incident on the first reflection surface. The light entrance end of the nonlinear crystal is cut at Brewsters-angle. The prism 12 is fused silica formed as a porro-prism having the usual 90° sides with the light entrance side cut at Brewsters-angle. The prism 12 is positioned such that light is received by the surface cut at Brewsters angle and the light passing through the medium of the prism will be incident on one 90° surface, reflected to the other 90 degree surface and back out through the prism medium parallel with the light directed toward the 90° surfaces. The calcite prism 12 is positioned adjacent to the Brewster-angle end of the prism 11 with its optic axis parallel with the optic axis of the nonliner crystal and perpendicular to the light, as shown. The calcite prism is positioned such that incident light passes through the prism and into the nonlinear-crystal parallel with its linear axis. The Brewster-Porro prism 12 is positioned such that light reflected back by the nonlinear crystal passes through the calcite prism and is received by the Brewster-Porro prism such that the light is reflected back by the prism 12 parallel with the incoming light. Alignment of the element in the plane of the diagram is automatic because of the retro-reflecting properties of the 90° roof ends 14 and 15. The only critical adjustment is to make the spines of the two roofs optically parallel. The nonlinear crystal is placed within an oven, not shown for simplification of the drawing, to adjust the crystal for the proper condition for phase matching of light.

The pump energy which is polarized perpendicular to the plane of the paper, as shown by the drawing, enters the cavity as an extraordinary wave in the minimum-deviation calcite prism and leaves the cavity in the same manner after two passes through the ADP crystal due to a double reflection by the 90° end surfaces. The light reflected back through the calcite prism is directed as polarized light parallel with the plane of the paper to the Brewster-Porro prism 12 which redirects the light back toward the calcite prism.

When the nonlinear crystal, calcite prism and Brewster-Porro prism are in optical alignment the light will be reflected back in the system. However, the signal and idler can be coupled out at one of the refracting surfaces by slightly rotating the surface away from its Brewster angle orientation. Therefore, the output of the cavity may be directed from the Brewster angle surface of the prism 12 or a surface of the calcite prism as represented by the output lines shown in the drawing. Dispersion in the media of the cavity will result in a slight angular shift of the signal and idler with respect to the pump energy, resulting in a slight non-collinear paraction interaction.

The optical configuration shown in the drawing illustrates a unique system for a parametric oscillator which operates to provide a light output without any optical coated surfaces which may be affected by a high power laser pump.

An optical system as described herein is useful for upconverting a pump light to the visible such as transmission of a pump light of 2660 Angstrum units to an output of 5320 Angstrum units.

Obviously many modifications and variations of the present invention are possible in the light of the above teachings. It is therefore to be understood that within the scope of the appended claims the invention may be practiced otherwise than as specifically described.

What is claimed and desired to be secured by Letters Patent of the United States is:

1. A cavity for forming a parametric oscillator which comprises;
   a nonlinear-crystal,
   said non-linear crystal including a porro-prism end and a Brewster-angle end,
   a birefringent minimum deviation prism positioned adjacent to said Brewster angle end of said nonlinear crystal for receiving pump radiation on one surface thereof, and a Brewster-Porro prism in optical alignment with said nonlinear crystal and said birefringent minimum deviation prism to receive light refracted by said birefringent minimum deviation prism.

2. A cavity is claimed in claim 1, wherein;
said nonlinear crystal is aligned such that the optic axis is parallel with the optic axis of said birefringent minimum deviation prism and the X and Y axis are 45° from the direction of propagation of the light.

3. A cavity as claimed in claim 2, wherein;
said Brewster-Porro prism is slightly rotated away from its Brewster angle orientation in the optical path whereby a light beam may be coupled out at the refracting surface of said Brewster-Porro prism.

4. A cavity as claimed in claim 3, wherein;
said birefringent minimum deviation prism is made of calcite.

5. A cavity as claimed in claim 4, wherein;
said calcite prism provides a means of coupling pump light into and out of said parametric oscillator cavity.

* * * * *